US008887829B2

(12) United States Patent
Ayer et al.

(10) Patent No.: US 8,887,829 B2
(45) Date of Patent: Nov. 18, 2014

(54) STATIC/DYNAMIC SHAFT SEAL

(75) Inventors: John W. Ayer, Milford, NH (US); Mark A. Chiasson, Merrimack, NH (US)

(73) Assignee: Hubbell Incorporated, Shelton, CT (US)

( * ) Notice: Subject to any disclaimer, the term of this patent is extended or adjusted under 35 U.S.C. 154(b) by 1990 days.

(21) Appl. No.: 11/602,135

(22) Filed: Nov. 20, 2006

(65) Prior Publication Data
US 2008/0115629 A1 May 22, 2008

(51) Int. Cl.
*B25B 13/00* (2006.01)
*F16J 15/34* (2006.01)
*B25B 19/00* (2006.01)
*B25B 21/00* (2006.01)
*B25F 5/00* (2006.01)
*F16J 15/32* (2006.01)

(52) U.S. Cl.
CPC ............. *F16J 15/3236* (2013.01); *B25B 21/00* (2013.01); *B25F 5/005* (2013.01); *F16J 15/3252* (2013.01)
USPC ............................. 173/104; 173/200; 277/361

(58) Field of Classification Search
USPC .......... 173/104, 200; 277/361, 590, 596, 908, 277/909, 944
See application file for complete search history.

(56) References Cited

U.S. PATENT DOCUMENTS

| 2,625,413 | A | | 1/1953 | Christensen | 286/26 |
|---|---|---|---|---|---|
| 2,666,659 | A | | 1/1954 | Audemar | 286/26 |
| 2,892,645 | A | * | 6/1959 | Tydeman | 277/589 |
| 3,048,413 | A | * | 8/1962 | Wood | 277/361 |
| 3,300,225 | A | | 1/1967 | Shepler | 277/165 |
| 3,379,443 | A | * | 4/1968 | Park et al. | 277/369 |
| 3,556,173 | A | | 1/1971 | Grothoff | 141/20 |
| 3,738,665 | A | * | 6/1973 | Bilco | 277/558 |
| 3,739,863 | A | * | 6/1973 | Wohlwend | 173/204 |
| 3,799,559 | A | * | 3/1974 | Kayser | 277/374 |
| 3,818,926 | A | * | 6/1974 | Wohlwend | 137/101 |
| 4,187,708 | A | * | 2/1980 | Champoux | 72/30.1 |
| RE31,171 | E | | 3/1983 | Brent | 277/188 |
| 4,415,166 | A | | 11/1983 | Beia | 277/51 |
| 4,548,229 | A | * | 10/1985 | Johnson | 137/270 |
| 4,645,214 | A | | 2/1987 | Copley | 277/112 |

(Continued)

FOREIGN PATENT DOCUMENTS

JP 2005-76681 A 3/2005

*Primary Examiner* — Michelle Lopez
(74) *Attorney, Agent, or Firm* — Harrington & Smith

(57) ABSTRACT

Disclosed herein is a hydraulic hand tool. The tool includes a frame, a hydraulic drive, a drive shaft, and a seal assembly. The hydraulic drive is connected to the frame and includes a housing. The drive shaft extends from the hydraulic drive. The seal assembly is located between the drive shaft and the housing. The seal assembly includes a first seal member, a second seal member, and a carrier ring. The first seal member is in contact with the housing. The second seal member is in contact with the drive shaft. The carrier ring has an outer annular groove and an inner annular groove. The first seal member is located within the outer annular groove. The second seal member is located within the inner annular groove. The carrier ring includes a polymer material configured to elastically deform in response to a hydraulic load from hydraulic fluid at the hydraulic drive.

8 Claims, 3 Drawing Sheets

(56) References Cited

U.S. PATENT DOCUMENTS

| | | | |
|---|---|---|---|
| 4,653,339 A | 3/1987 | Komatsu et al. | 74/422 |
| 5,024,451 A * | 6/1991 | Borowski | 277/412 |
| 5,425,164 A * | 6/1995 | El Dessouky | 29/243.524 |
| 5,893,419 A * | 4/1999 | Hodges | 173/13 |
| 6,186,510 B1 * | 2/2001 | Reagan | 277/371 |
| 6,325,381 B1 * | 12/2001 | von Engelbrechten | 277/361 |
| 6,409,177 B1 * | 6/2002 | Johnston | 277/551 |
| 2005/0045439 A1 | 3/2005 | Nishiyama | 188/290 |

\* cited by examiner

STATIC/DYNAMIC SHAFT SEAL

BACKGROUND OF THE INVENTION

1. Field of the Invention

The present invention relates to a seal assembly and, more particularly, to an improved seal assembly for minimizing fluid leakage in a hydraulic hand tool.

2. Brief Description of Prior Developments

Hydraulic powered hand tools are commonly used in manufacturing, industrial, and maintenance sites and facilities. These tools include drivers for bolts, nuts, screws and like fasteners. In these settings it is often critical that particular fasteners be installed with a predetermined amount of torque at high torque values.

With the demand for increasingly high power and torque settings required for various applications, the current seals surrounding a drive shaft and contacting a motor housing of these hydraulic powered hand tools are limited in life. The current seals, such as the seal disclosed in U.S. Pat. No. 3,738,665, or the lip seal used in current BURNDY® hydraulic tools, produce shaft wear. Although the seal has a much lower hardness than the hardened steel shaft, under temperature and elevated hydraulic pressure, the seal is abrasive to the steel and causes wear rings to be formed. At high speeds/temperatures/pressures, these wear clearances are nominal because the parts are expanded. However, once the tool sets for a few hours, the clearance between the seal and the shaft becomes more pronounced. Worn seals between the hand tool housing and the shaft have been a known problem that results in fluid leakage from the motor. The seal disclosed in U.S. Pat. No. 3,738,665 utilizes a hard (inflexible) steel carrier ring having an inner and an outer seal. The inner seal is expanded by o-ring, and the entire seal assembly is compressed under hydraulic load. This results in non-uniform sealing pressure which promotes shaft and seal wear. The seals may further exhibit distortion and result in unacceptable clearances minimizing the effectiveness of the seal.

Therefore, there is a need for a seal assembly which provides a substantially uniform sealing pressure against the shaft and the housing when the tool is hydraulically loaded and when the tool is at rest. This uniform sealing pressure reduces wear, minimizes leakage and promotes increased service life of the seal assembly.

SUMMARY OF THE INVENTION

In accordance with one aspect of the present invention, a hydraulic hand tool is disclosed. The hydraulic hand tool includes a frame, a hydraulic drive, a drive shaft, and a seal assembly. The hydraulic drive is connected to the housing and includes a housing. The drive shaft extends from the hydraulic drive. The seal assembly is located between the drive shaft and the housing. The seal assembly includes a first seal member, a second seal member, and a carrier ring. The first seal member is in contact with the housing. The second seal member is in contact with the drive shaft. The carrier ring has an outer annular groove and an inner annular groove. The first seal member is located within the outer annular groove. The second seal member is located within the inner annular groove. The carrier ring includes a polymer material configured to elastically deform in response to a hydraulic load from hydraulic fluid at the hydraulic drive.

In accordance with another aspect of the present invention, a seal assembly is disclosed. The seal assembly includes a first seal member, a second seal member, and a carrier ring. The first seal member is adapted to contact a housing. The second seal member is adapted to contact a shaft. The carrier ring has an outer annular groove and an inner annular groove. The first seal member is located within the outer annular groove. The second seal member is located within the inner annular groove. The carrier ring has a coefficient of thermal expansion substantially similar to a coefficient of thermal expansion of the first seal member and/or the second seal member.

In accordance with yet another aspect of the present invention, a seal assembly is disclosed. The seal assembly includes a first seal member, a second seal member, and a carrier ring. The first seal member is configured to contact a housing. The second seal member is configured to contact a rotating shaft. The rotating shaft is driven by a hydraulic load. The carrier ring has an outer annular groove and an inner annular groove. The first seal member is located within the outer annular groove. The second seal member is located within the inner annular groove. The carrier ring is comprised of a polymer material configured to elastically deform in response to hydraulic fluid forming the hydraulic load.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
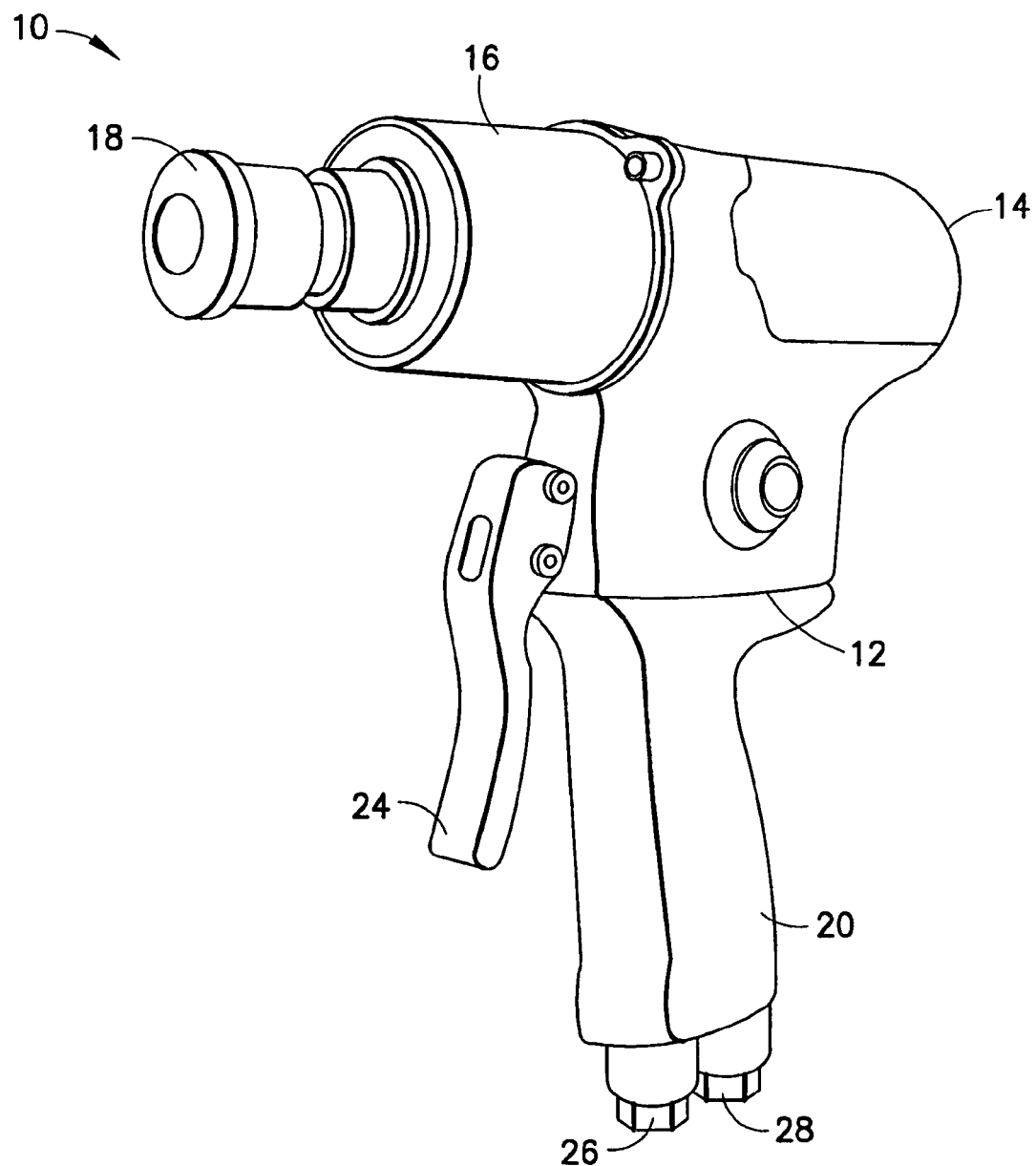
FIG. 1 is a perspective view of a hydraulically driven hand tool incorporating the improved seal assembly disclosed herein.

Referring to FIG. 1, there is shown a hydraulically driven hand tool 10, which may be a variable torque impact wrench for example, incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

The hand tool 10 includes a frame 12, a hydraulic drive 14, an impact mechanism 16, and a chuck 18. The frame 12 further includes a handle 20. It is to be understood that the handle 20 may be attached to or be integral with the frame 12. The hydraulic drive 14, which may be a motor such as a gerotor type motor for example, is attached to the frame 12. A drive shaft 22 (illustrated in FIG. 2) extends from the hydraulic drive 14 and is connected to the impact mechanism 16. The impact mechanism 16 is connected to the chuck 18 and transmits torque, and/or repetitive strikes or impacts, through the chuck 18 to a workpiece (not shown). In this embodiment the chuck 18 is capable of accommodating removable attachments such as bits and other accessories. In an alternative embodiment, it is to be understood that the attachment may be fixedly attached to the chuck 18. A trigger 24 controlling fluid flow, and thus the hydraulic load, for energizing and de-energizing the hand tool is attached to the frame 12. Fluid from a hydraulic fluid reservoir (not shown) enters the hand tool 10 through a supply line (not shown) connected to the supply port 26. Fluid returns to the hydraulic fluid reservoir through supply lines connected to the return port 28. It should be noted that in an alternative embodiment, the hydraulic fluid reservoir may be integral with the hand tool 10.

Figure 2:
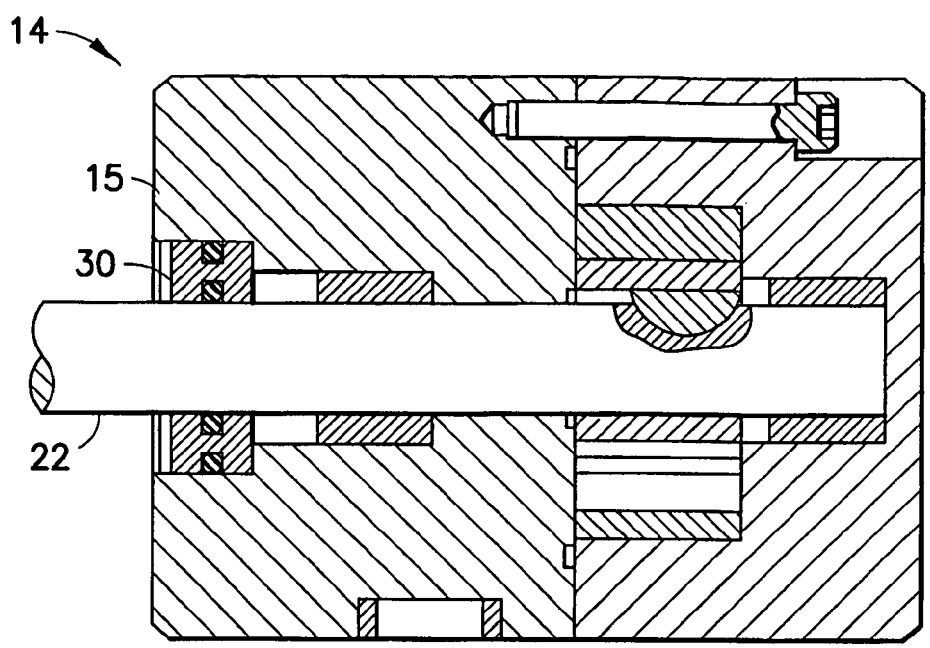
FIG. 2 is a cross sectional view of a hydraulic drive.
Figure 4:
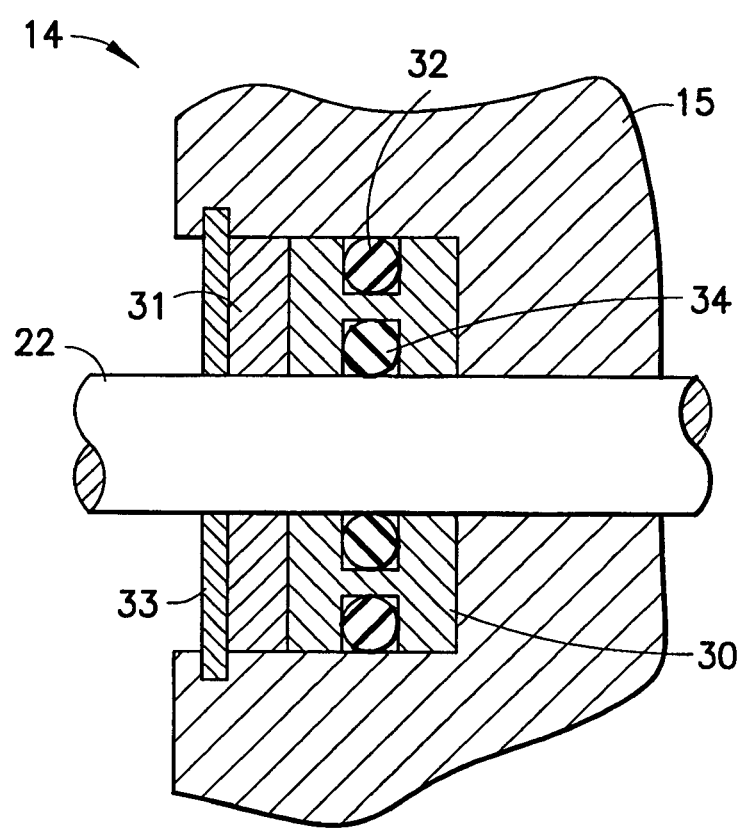
FIG. 4 is an enlarged partial cross sectional view of the hydraulic drive of FIG. 2.

FIG. 2 illustrates a cross section view of the hydraulic drive 14. A seal assembly 30 is disposed between a housing 15 of the hydraulic drive 14 and the shaft 22. The seal assembly 30 may be held in place between the housing 15 and the shaft 22 by a retaining washer 31 and a retaining clip 33 as illustrated in FIG. 4. The seal assembly 30 is a static/dynamic shaft seal which prevents fluid leakage from the hydraulic drive 14. The static portion of the seal is configured to prevent leakage between the hydraulic drive 14 and the seal assembly 30. The dynamic portion of the seal is designed to prevent leakage from around the shaft 22, while the shaft 22 is rotating and while at rest. The seal assembly 30 also creates a viable seal for pressurized and non-pressurized conditions of the hand tool 10.

Figure 3:
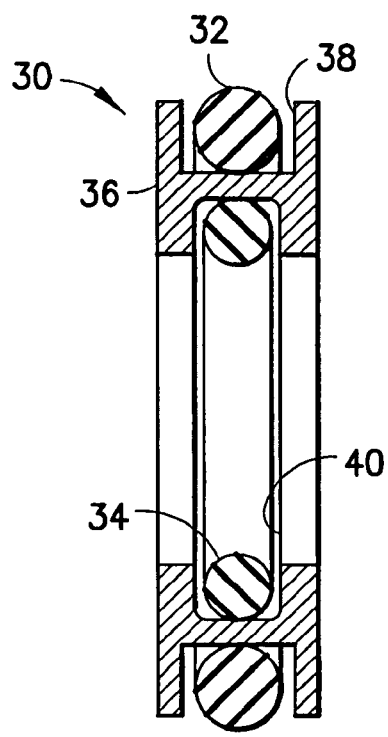
FIG. 3 is a cross sectional view of the disclosed seal assembly.

FIG. 3 illustrates a cross-section view of the seal assembly 30. The seal assembly 30 comprises a first seal member 32, a second seal member 34, and a carrier ring 36 supporting the first seal member 32 and the second seal member 34. The first and second seal members 32 and 34 may be o-ring type seals for example.

The first seal member 32 is the static seal portion of the seal assembly 30 and is disposed within an outer annular groove 38 of the carrier ring 36. The first seal member 32 is in contact with the housing 15 as illustrated in FIG. 4. The first seal member 32 may be fabricated from an elastomeric material, such as a Buna rubber material for example, or any such elastomeric material capable of achieving an adequate seal between stationary parts.

The second seal member 34 is the dynamic seal portion of the seal assembly 30 and is disposed within an inner annular groove 40 of the carrier ring 36. The second seal member is in contact with the drive shaft 22 as illustrated in FIG. 4. The second seal member 34 may be fabricated from an elastomeric material, such as a polyurethane material for example, or any such elastomeric material capable withstanding heat and friction generated by the rotary motion of the shaft 22.

The carrier ring 36 is fabricated from a flexible polymer material which provides for a generally uniform sealing pressure against the shaft 22 and the housing 15 when the hand tool 10 is in use (hydraulically loaded) and when the hand tool 10 is not in use (no hydraulic load). The flexible polymer material may be an engineering plastic material, capable of supporting the seal members 32 and 34 under the pressures and temperatures experienced during hand tool 10 operations, such as acetal resin, polyoxymethylene, polytrioxane, polyformaldehyde, paraformaldehyde, or Delrin®, for example.

The use of a flexible polymer for the carrier ring 36 provides for many significant advantages over existing designs having steel carrier rings. The flexible polymer materials, such as those mentioned above, have high deflection temperatures (such as, about 260° F. for example). Deflection temperature, or heat deflection temperature, is an indication of the ability of the material to perform at elevated temperatures and under a load. These polymer materials allow for the carrier ring 36 to maintain its dimensions and resist distortion under elevated temperatures and load.

One significant advantage over steel carrier rings is that the disclosed carrier ring 36 is configured to elastically deform in response to the hydraulic load. This elastic deformation allows for maintaining a substantially uniform load on the housing 15 and the shaft 22. Generally, polymers have a rather large elastic deformation range when compared to steel. This increased elastic deformation range allows the disclosed carrier ring 36 to exhibit flexibility under an applied load. This flexibility under an applied load, from the hydraulic fluid for example, provides for a shared load distribution between the carrier ring 36 and the seal members 32 and 34. Deflection of the carrier ring 36 and the seal members 32 and 34 under the applied load permits the entire seal assembly 30 to exhibit substantially uniform mechanical flexibility. This aids in maintaining a substantially uniform seal pressure against the housing 15 and the shaft 22.

Another significant advantage over conventional steel carrier ring configurations may be attained by utilizing seal member and carrier ring materials having substantially similar coefficients of thermal expansion. Generally, the coefficient of thermal expansion of polymers is greater than that of steels. This allows for substantially uniform expansion and contraction of the entire seal assembly 30 during all phases of operation while the hand tool 10 is energized and when the hand tool 10 is de-energized. The uniform thermal growth of the seal assembly 30 significantly reduces potential fluid leaks by reducing thermal stresses and maintaining a substantially uniform pressure seal. Existing designs having steel carrier rings experience a thermal mismatch problem as the seal members and the carrier ring expand and contract at different rates. The thermal mismatch promotes cracking, pitting, hardening, and/or deformation of the seal assembly. These conditions may result in a compromise of the seal member geometry and in turn cause shaft wear and hydraulic fluid leaks.

The disclosed carrier ring 36 having improved flexibility and thermal matching characteristics provides for uniform sealing pressure against the shaft 22 and the housing 15. The disclosed configuration results in reduced wear on the shaft 22, increased durability of the seal members 32 and 34, and extended service life of the seal assembly 30.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A hydraulic hand tool comprising:
   a frame;
   a hydraulic drive connected to the frame, wherein the hydraulic drive comprises a housing;
   a drive shaft extending from the hydraulic drive; and
   a seal assembly between the drive shaft and the housing, wherein the seal assembly comprises a first seal member in contact with the housing, a second seal member in contact with the drive shaft, and a carrier ring having an outer annular groove and an inner annular groove, wherein the first seal member is disposed within the outer annular groove, wherein the second seal member is disposed within the inner annular groove, wherein the carrier ring is comprised of a polymer material configured to elastically deform and maintain a substantially uniform sealing pressure against the drive shaft and the housing in response to a hydraulic load from hydraulic fluid at the hydraulic drive, and wherein the carrier ring has a coefficient of thermal expansion substantially similar to a coefficient of thermal expansion of the first seal member and/or the second seal member.

2. A seal assembly comprising:
   a first seal member adapted to contact a housing;
   a second seal member adapted to contact a shaft; and
   a carrier ring having an outer annular groove and an inner annular groove, wherein the first seal member is disposed within the outer annular groove, wherein the second seal member is disposed within the inner annular groove, and wherein the carrier ring has a coefficient of thermal expansion substantially similar to a coefficient of thermal expansion of the first seal member and/or the second seal member, wherein the seal assembly is configured to exhibit substantially uniform mechanical flexibility under an applied hydraulic load.

3. The seal assembly of claim 2 wherein the carrier ring is fabricated from a flexible material.

4. The seal assembly of claim 2 wherein the first seal member is adapted to provide a static seal between the housing and the first seal member.

5. The seal assembly of claim 2 wherein the second seal member is adapted to provide a dynamic seal between the shaft and the second seal member.

6. The seal assembly of claim 2 wherein the second seal member is adapted to provide a substantially uniform pressure seal between the shaft and the second seal member.

7. A hand-held hydraulic impact wrench comprising a frame, a hydraulic drive comprising a housing, and a seal assembly as in claim 2 between a shaft of the hydraulic drive and the housing.

8. A seal assembly comprising:
a first seal member configured to contact a housing;
a second seal member configured to contact and form a seal with a rotating shaft, wherein the rotating shaft is driven by a hydraulic load; and
a carrier ring having an outer annular groove and an inner annular groove, wherein the first seal member is disposed within the outer annular groove, the second seal member is disposed within the inner annular groove, the carrier ring is comprised of a polymer material configured to elastically deform in response to hydraulic fluid forming the hydraulic load, and wherein the carrier ring has a coefficient of thermal expansion substantially similar to a coefficient of thermal expansion of the first seal member and/or the second seal member.

* * * * *